US006956692B2

(12) United States Patent
Duerr et al.

(10) Patent No.: US 6,956,692 B2
(45) Date of Patent: Oct. 18, 2005

(54) METHOD AND APPARATUS FOR CONTROLLING EXPOSURE OF A SURFACE OF A SUBSTRATE

(75) Inventors: Peter Duerr, Dresden (DE); Torbjoern Sandstroem, Taeby (SE)

(73) Assignee: Micronic Laser Systems, AB, Taeby (SE)

(*) Notice: Subject to any disclaimer, the term of this patent is extended or adjusted under 35 U.S.C. 154(b) by 0 days.

(21) Appl. No.: 10/977,394

(22) Filed: Oct. 29, 2004

(65) Prior Publication Data

US 2005/0139755 A1 Jun. 30, 2005

Related U.S. Application Data

(63) Continuation of application No. PCT/EP03/04283, filed on Apr. 24, 2003.

(51) Int. Cl.[7] ........................ G02B 26/08; G02B 26/00; G03F 1/00; G03F 9/00; A61N 5/00

(52) U.S. Cl. ........................ 359/298; 359/291; 359/293; 359/224; 430/5; 430/22; 250/492.1; 355/35; 356/317

(58) Field of Search ................................ 359/290, 291, 359/293, 295, 298, 224, 855; 430/5, 22, 30; 250/492.1, 492.2; 355/35, 53, 67; 356/317

(56) References Cited

U.S. PATENT DOCUMENTS 5,822,110 A * 10/1998 Dabbaj ........................ 359/293
5,926,309 A * 7/1999 Little .......................... 359/293
6,312,134 B1 * 11/2001 Jain et al. .................... 359/855
6,473,237 B2 * 10/2002 Mei ............................ 359/619
6,504,644 B1 1/2003 Sandstrom .................. 359/291
6,567,163 B1 * 5/2003 Sandstrom .................. 356/317

FOREIGN PATENT DOCUMENTS

WO WO 03/23494 3/2003 ........... G02B/27/46

OTHER PUBLICATIONS

Seunarine, K., D. Calton, I. Underwood, J. Stevenson, A. Gundlach, and M. Begbie; *Techniques to Improve the Flatness of Reflective Micro–Optical Arrays*; 1999; Elsevier Science S.A.

* cited by examiner

*Primary Examiner*—Loha Ben
(74) *Attorney, Agent, or Firm*—Michael A. Glenn; Glenn Patent Group

(57) ABSTRACT

A method and an apparatus for controlling exposure of a surface of a substrate in a process of structuring the substrate with light of a predetermined intensity are described, wherein the light is directed to the surface by means of a deflectable mirror. The intensity has a first maximum at a first deflection of the deflectable mirror, a first minimum at a second deflection of the deflectable mirror, a second maximum at a third deflection of the deflectable mirror, and a second minimum at a fourth deflection of the deflectable mirror. A signal representing the predetermined intensity, and a signal representing a threshold intensity are received, the threshold intensity being equal to or less than the intensity of the second maximum. It is determined whether the predetermined intensity is greater than the threshold intensity. The deflection of the deflectable mirror is controlled to be between the first deflection and the second deflection when the predetermined intensity is greater than the threshold intensity, and to be equal to or greater than the third deflection when the predetermined intensity is equal to or less than the threshold intensity.

13 Claims, 6 Drawing Sheets

METHOD AND APPARATUS FOR CONTROLLING EXPOSURE OF A SURFACE OF A SUBSTRATE

CROSS-REFERENCE TO RELATED APPLICATIONS

This application is a continuation of co-pending International Application No. PCT/EP03/04283, filed Apr. 24, 2003, which designated the United States and was not published in English and is incorporated herein by reference in its entirety.

BACKGROUND OF THE INVENTION

1. Field of the Invention

The present application relates to a method and an apparatus for controlling exposure of a surface of a substrate. In particular, the present invention relates to an improved CD control (CD=Critical Dimension) in micro lithography pattern generators using spatial light modulators (SLM).

2. Description of the Related Art:

The prior art basically describes two different approaches for implementing a pattern generator using a SLM for generating a pattern to be transferred to a surface of a substrate.

The first approach uses large pixel deflections, i.e., the deflection is large when compared to the radiation wavelength used. Further, a substantially digital, i.e., on and off, addressing is used. An example for this first approach is the Texas Instrument's DLP chip with deflection angles of +/−10°. With a pixel grid size of 17 $\mu$m the system can be described by classical light rays which are reflected by the individual pixels either into a projection lens (bright spot) or to an absorber (dark spot). Grey pixels can be obtained by time multiplexing for continuous light sources, and by multiple exposures for pulsed light sources.

The second approach uses a deflection at about half the radiation wavelength and an analog addressing. For this approach the SLM is described as a phase grating causing interference. Reflected light is only found in discrete diffraction orders. Conventionally, such a micro lithography pattern generator having a SLM uses the zero order to generate a pattern. That is bright spots are obtained for non-deflected pixels, and dark spots are obtained for deflected pixels. Grey pixels can be generated in one light pulse by partial deflection.

In micro lithography pattern generators grey pixels are needed to obtain an addressing grid finer than the projected pixel grid. The exact grey level has to be controlled very tightly as it directly affects the uniformity of the critical dimension (CD) which is one of the most important performance parameters of micro lithography pattern generators.

The above described first prior art approach is disadvantageous in that a large amount of time for the multiple exposures is required. This reduces the throughput, a second very important performance parameter of micro lithography pattern generators. Patterning the substrates using analog addressing but still with a large deflection would cure this disadvantage. However, the precision requirements in the deflection control can not be met as the intensity in the generated image changes very quickly in a small fraction of the deflection addressing range. Even worse, the non-symmetrical illumination of the projection optics for grey pixels ruins CD control completely, even for minute focus errors.

The above described second prior art approach works good for ideally flat pixels, e.g., for ideally flat micro-mirrors in a SLM. CD control is very good, and the CD is a smooth, though nonlinear function of the intensity reflected from the pixel (mirror), the reflected intensity, again, being a smooth but non-linear function of the deflection as is shown in FIG. 5. FIG. 5 is a graph of the relative intensity versus the relative deflection of a mirror of the SLM, i.e., the relative intensity of light at a predetermined pixel on a substrate to be patterned in response to a specific deflection of the mirror. As can be seen, the first maximum 50 of the intensity is obtained when the relative deflection is zero, and the first minimum 52 of the intensity is obtained when the relative deflection is one. Also a second maximum and a second minimum are shown. As can be seen from FIG. 5, binary switching of intensity between maximum and zero intensity can be simply achieved by switching deflection between zero deflection and a relative deflection of one. The maximum intensity decreases rapidly with growing deflection. Therefore, alternatively, any large relative deflection may be used for producing (near) zero intensity. As can be further seen from FIG. 5, by using the second prior art approach, a continuous change in intensity from nominal dose (maximum dose or relative intensity one) to zero (reached at a relative deflection one or nominal deflection) can be obtained.

A disadvantage when producing grey levels arises from pixels (mirrors) which are not perfectly flat. FIG. 6 shows the relative intensity versus the relative deflection for pixels (mirrors) having a bend or non-planarity. For clarity, the non-planarity is quite strong, and as can be seen, the intensity in the first maximum 50 is lower than shown in FIG. 5. More importantly, the first minimum 52 does not reach zero intensity any more. This means that the contrast is reduced. Although this reduced contrast is not a problem itself as long as the minimum is reasonably low, a serious consequence of the non-planarity of the mirror is that the phase of the reflected light changes. This can be seen in detail in FIG. 7 showing the complex amplitude of the reflected light. Corresponding points in FIG. 6 and 7 have assigned the reference signs a to e. For a perfectly flat mirror the amplitude is always real. For the non-flat mirror, the phase is continuously changing with deflection. In particular, for the first minimum 52(*b*) the phase is about 90° different from the phase in the maximum 50(*a*), which is zero. In perfect focus, i.e., when the surface to be patterned is perfectly within focus this change of the phase would cause a minor shift in CD, which still could be accounted for. However, when leaving the focus, a first order change of the CD occurs, when compared to the second order effect for a flat pixel. Since the focus can only be finitely accurate, the CD control in a pattern generator is very limited.

FIGS. 8 and 9 are Bossung-plots of the CD versus a defocusing parameter. The defocusing parameter describes the relative deviation from the focus (defocusing parameter=0). FIGS. 8 and 9 show groups of curves for different doses, wherein the dose is the integral of the intensity over the exposure time. FIG. 8 shows the Bossung-plot for an ideally planar micro-mirror. The curves show no skew, i.e., a good control of the CD. When going through focus, the change of the CD is a second-order effect. FIG. 9 shows the Bossung-plot for a badly non-planar pixel. The graphs show a pronounced skew, which is a first-order change of the CD with defocus.

SUMMARY OF THE INVENTION

Starting from this prior art, it is the object of the present application to provide a method and an apparatus for controlling the exposure of a substrate, such that an improved CD control despite any arrangement of the substrate out of focus is obtained.

In accordance with a first aspect, the present invention provides a method for controlling exposure of a surface of a substrate in a process of structuring the substrate with light of a predetermined intensity, the light being directed to the surface by means of a deflectable mirror, the intensity having a first maximum at a first deflection of the deflectable mirror, a first minimum at a second deflection of the deflectable mirror, a second maximum at a third deflection of the deflectable mirror, and a second minimum at a fourth deflection of the deflectable mirror, the method having the steps of receiving a signal representing the predetermined intensity; receiving a signal representing a threshold intensity, the threshold intensity being equal to or less than the intensity of the second maximum; determining whether the predetermined intensity is greater than the threshold intensity; and controlling the deflection of the deflectable mirror to be between the first deflection and the second deflection when the predetermined intensity is greater than the threshold intensity, and to be equal to or greater than the third deflection when the predetermined intensity is equal to or less than the threshold intensity.

In accordance with a second aspect, the present invention provides an apparatus for controlling exposure of a surface of a substrate in a process of structuring the substrate with light of a predetermined intensity, the light being directed to the surface by means of a deflectable mirror, the intensity having a first maximum at a first deflection of the deflectable mirror, a first minimum at a second deflection of the deflectable mirror, a second maximum at a third deflection of the deflectable mirror, and a second minimum at a fourth deflection of the deflectable mirror, the apparatus having means for receiving a signal representing the predetermined intensity; means for receiving a signal representing a threshold intensity, the threshold intensity being equal to or less than the intensity of the second maximum; a comparator for determining whether the predetermined intensity is greater than the threshold intensity; and a controller for controlling the deflection of the deflectable mirror to be between the first deflection and the second deflection when the predetermined intensity is greater than the threshold intensity, and to be equal to or greater than the third deflection when the predetermined intensity is equal to or less than the threshold intensity.

In accordance with a third aspect, the present invention provides an imaging device having a light source for emitting light; a spatial light modulator defining a pixel pattern to be transferred to a surface of a substrate, and receiving light from the light source, the spatial light modulator having an apparatus for controlling exposure of a surface of a substrate in a process of structuring the substrate with light of a predetermined intensity, the light being directed to the surface by means of a deflectable mirror, the intensity having a first maximum at a first deflection of the deflectable mirror, a first minimum at a second deflection of the deflectable mirror, a second maximum at a third deflection of the deflectable mirror, and a second minimum at a fourth deflection of the deflectable mirror, the apparatus having means for receiving a signal representing the predetermined intensity; means for receiving a signal representing a threshold intensity, the threshold intensity being equal to or less than the intensity of the second maximum; a comparator for determining whether the predetermined intensity is greater than the threshold intensity; and a controller for controlling the deflection of the deflectable mirror to be between the first deflection and the second deflection when the predetermined intensity is greater than the threshold intensity, and to be equal to or greater than the third deflection when the predetermined intensity is equal to or less than the threshold intensity; and a movable table supporting the substrate.

Contrary to the prior art approaches described above, it is the inventive concept to use the second minimum or a higher minimum of the intensity response for dark areas on the substrate. The present application is particularly advantageous for micro-mirrors in a spatial light modulator (SLM) where the diffraction pattern of the micro-mirror is highly sensitive to the flatness, or planarity, of a micro-mirror.

It is an advantage of the present invention that in accordance with the inventive approach of using the second minimum an intensity almost reaching zero can be obtained. Thereby the contrast of the generated pattern is largely improved.

A further advantage of the present invention is that there is no need for any principally new technology or fabrication steps. Also, existing actuator designs can be continued to be used. To reach the larger deflection range, only some technology parameter adjustments and/or small design modifications are necessary. With this low effort, a considerable improvement of the CD control and/or of the contrast in the pattern generator using an SLM is achieved.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
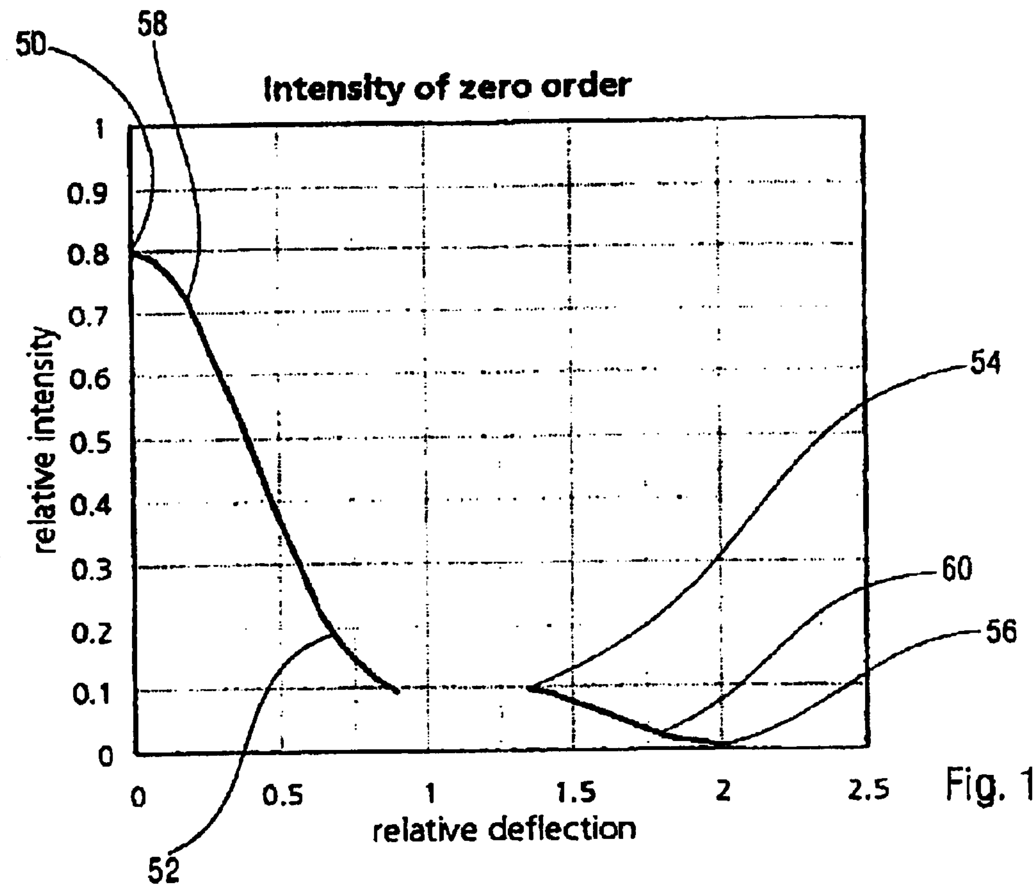
FIG. 1 is a graph of the relative intensity versus the relative deflection showing only those portions used for the pattern generation in accordance with the present application.
Figure 6:
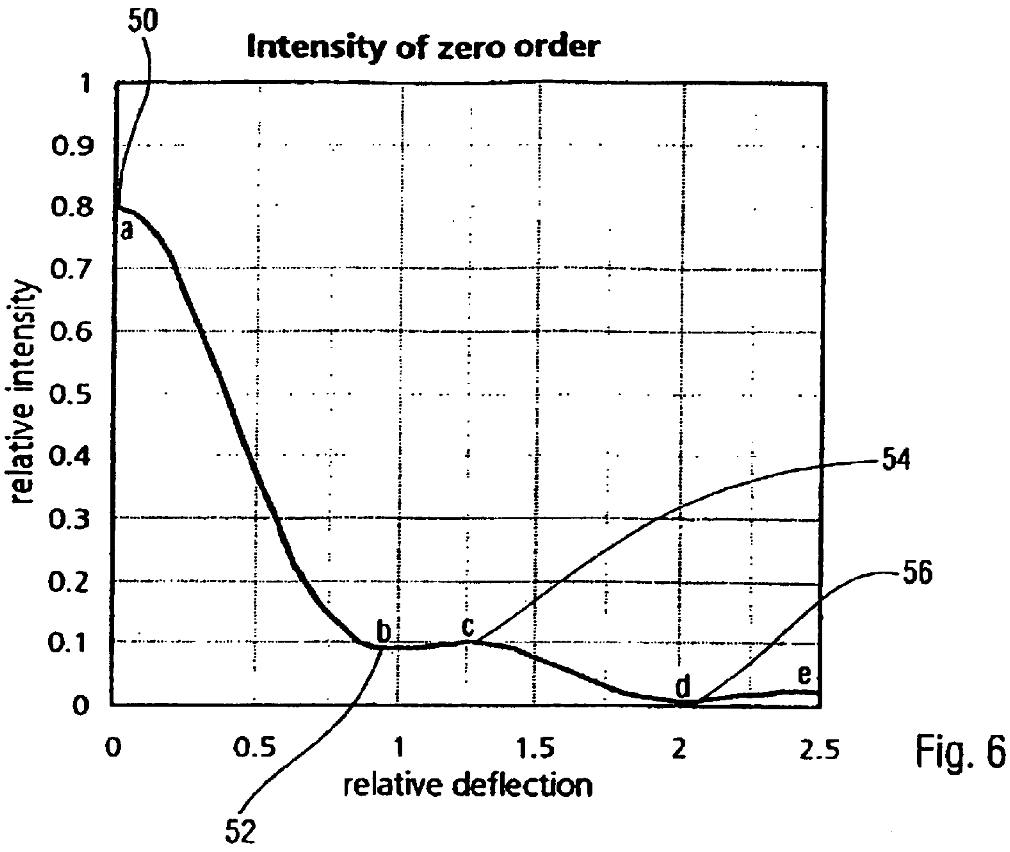
FIG. 6 is a graph of the relative intensity versus the relative deflection for a non-planar mirror.

FIG. 1 is, similar to FIG. 6, a graph of the relative intensity versus the relative deflection, however, only those portions 58, 60 are shown which are actually used for the pattern generation in accordance with the present invention.

Figure 2:
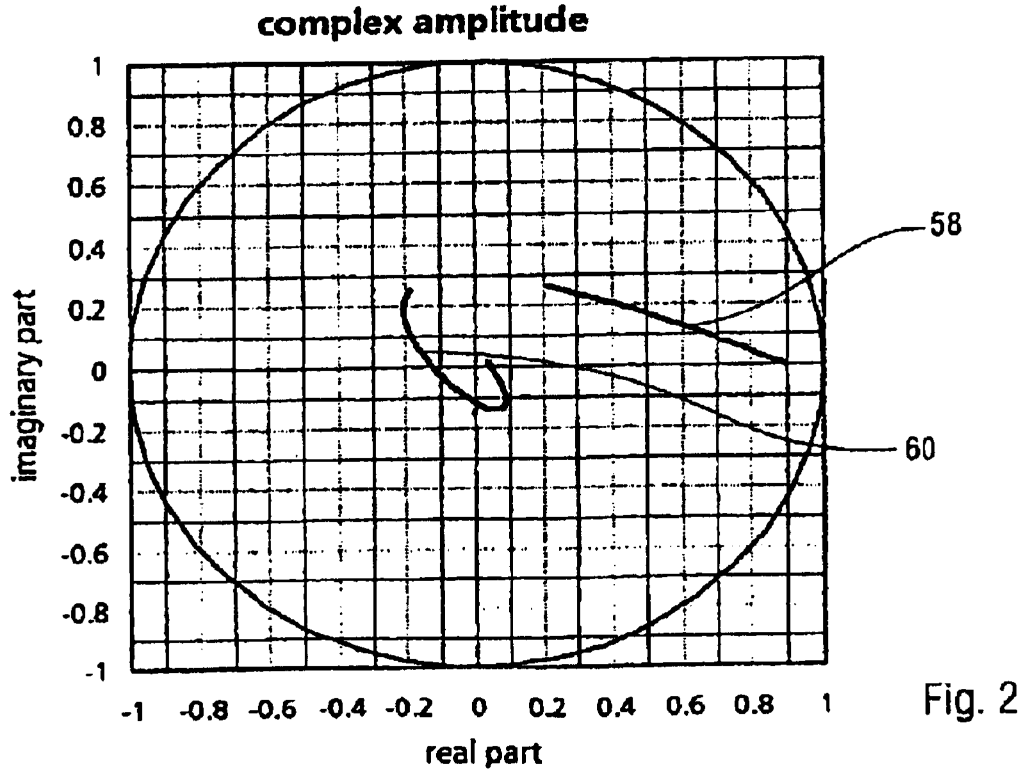
FIG. 2 is a graph of the complex amplitude of the intensity of FIG. 1 showing only those portions used for the pattern generation in accordance with the present application.
Figure 8:
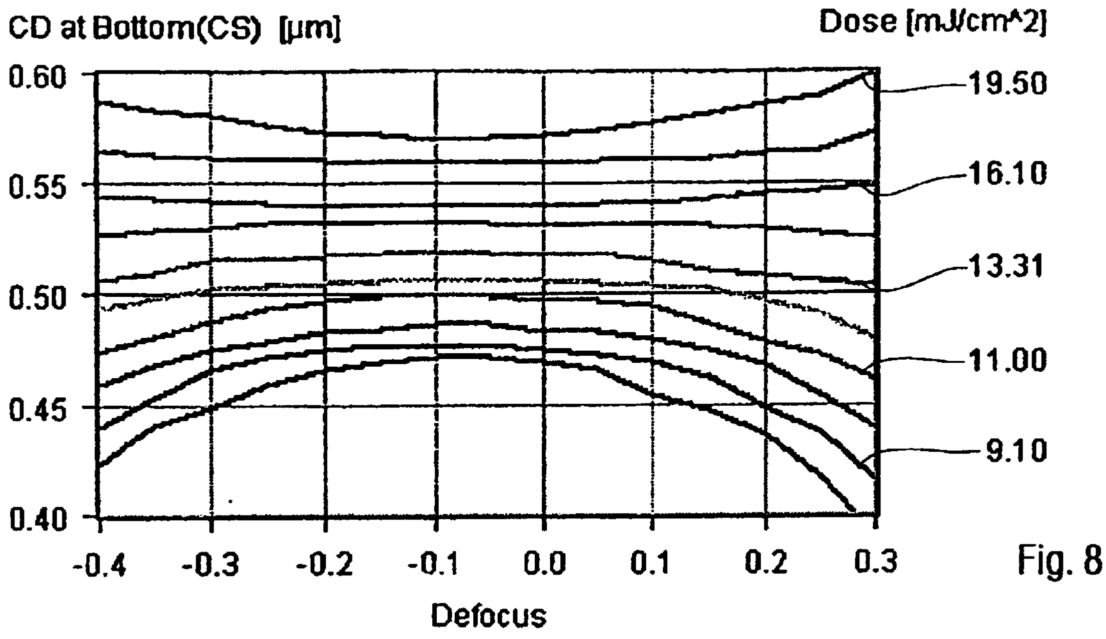
FIG. 8 is a Bossung-plot for a planar mirror.
Figure 9:
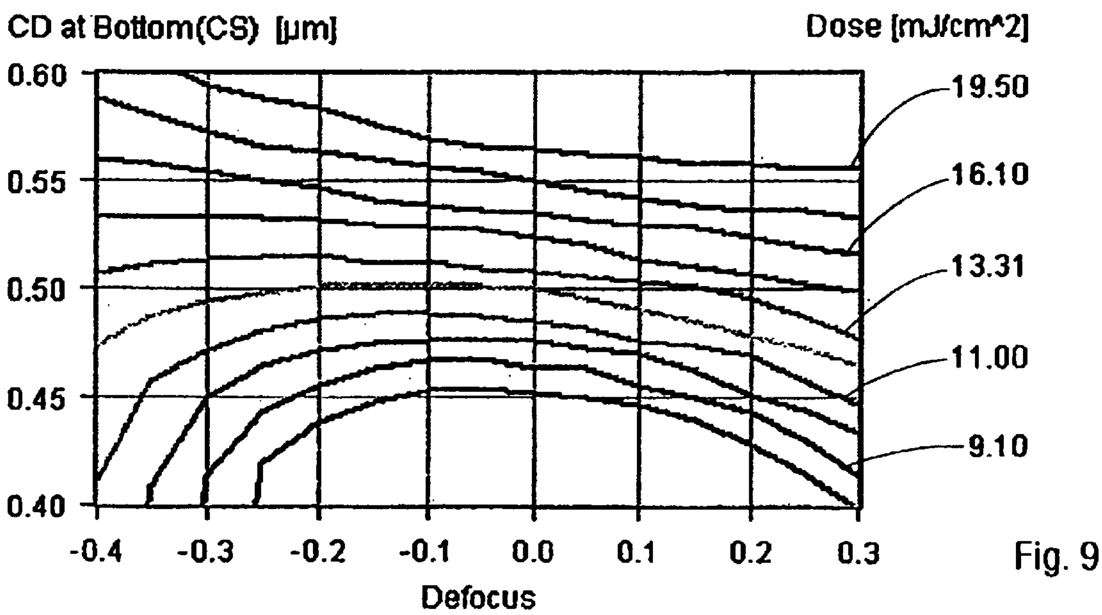
FIG. 9 is a Bossung-plot for a non-planar mirror.

FIG. 2 is a graph of the complex amplitude of the intensity of FIG. 1, and likewise only shows those portions used for the pattern generation in accordance with the present invention. As can be seen from a comparison with the above-described FIGS. 6 and 7, the complex amplitude in accordance with the present invention is much smaller for the second minimum (d) than for the first minimum (b). Therefore, using the second minimum instead of the first minimum causes much less problems with the defocus as was described above with reference to the Bossung-plots of FIGS. 8 and 9. Although grey pixels, i.e. pixels with intermediate intensity, still have a phase different from the phase of the first maximum, the most critical region close to 90° (positive imaginary amplitude) is completely avoided.

Therefore, according to the present application the CD control is better and a slight defocus is less critical. By avoiding phase angles close to 90° and the non-zero absolute value of the amplitude in the second minimum, a Bossung-plot similar to that shown in FIG. 8 for an ideally planar pixel is achieved. In this way, good CD control performance is achieved by the present invention even for a substrate to be patterned slightly out of focus.

In reality, the behavior is even better than shown in FIGS. 1 and 2 since the non-planarity of the mirror underlying the graphs of the FIGS. 1, 2, 6 and 7 is assumed to be quite large. For a more realistic and better planarity, the complex amplitudes used according to the present invention stay even closer to the real axis. Therefore, the present invention provides for a much better CD control performance through focus.

Although the influence of the phase on the CD control is the dominant problem which is solved by the present invention, it is a positive and important side effect that the corresponding intensity is reduced, as shown in FIG. 1, almost to zero. The minimum intensity is reduced by a large factor when the second minimum is used instead of the first minimum. Thereby the contrast of the generated pattern is largely improved.

For a non-planar mirror, the minima usually decrease with increasing deflection. Therefore, in order to further reduce the minimum intensity, even higher minima could be used. However, this would require an increased deflection addressing range, without much additional benefit. In order to avoid the necessity of an increased addressing resolution, a non-linear driver circuit is preferred which provides for high deflection addressing resolution in the first portion 58 between relative deflection zero and 0.8, relatively low deflection addressing resolution in the second portion 60 and a large deflection addressing range at the same time. The preferred non-linear driver circuit allows for a good relative grey scale resolution by providing a high deflection addressing resolution for low relative deflections where the intensity changes fast with the deflection and a lower deflection addressing resolution in the upper half of the deflection range where the intensity changes only slowly with the deflection and less deflection resolution is required therefore.

The present invention provides a simple way to obtain high grey scale accuracy with non-planar mirrors. In particular, the present invention is easier to implement than any further improvement of the planarity of the mirrors. It merely requires the rather simple adaptation of the controllers controlling the micro-mirrors. This adaptation can be done starting from existing SLM chips and micro lithography pattern generators. Thereby, the present invention allows faster and overall cheaper development of SLMs and pattern generators with the desired CD uniformity.

The concept underlying the present invention does not need any principally new technology or fabrication steps. Also, existing actuator designs can be continued to be used. To reach the larger deflection range, only some technology parameter adjustments and/or small design modifications might be made. With this low effort, a considerable improvement of the CD control and/or of the contrast in the pattern generator using an SLM of the realistic limited planarity is achieved.

As already outlined above, the inventive concept is easily implemented for pattern generators for other purposes than micro lithography using an SLM as a diffractive phase grating. Regardless of what technology is used for realizing SLMs, and what application or purpose they are made for, for real devices one has to be aware of an unwanted and systematic non-planarity and a resulting phase variation that is hard and costly to reduce by technological development. In all these cases the present invention improves the image quality with quite little effort.

Figure 3:
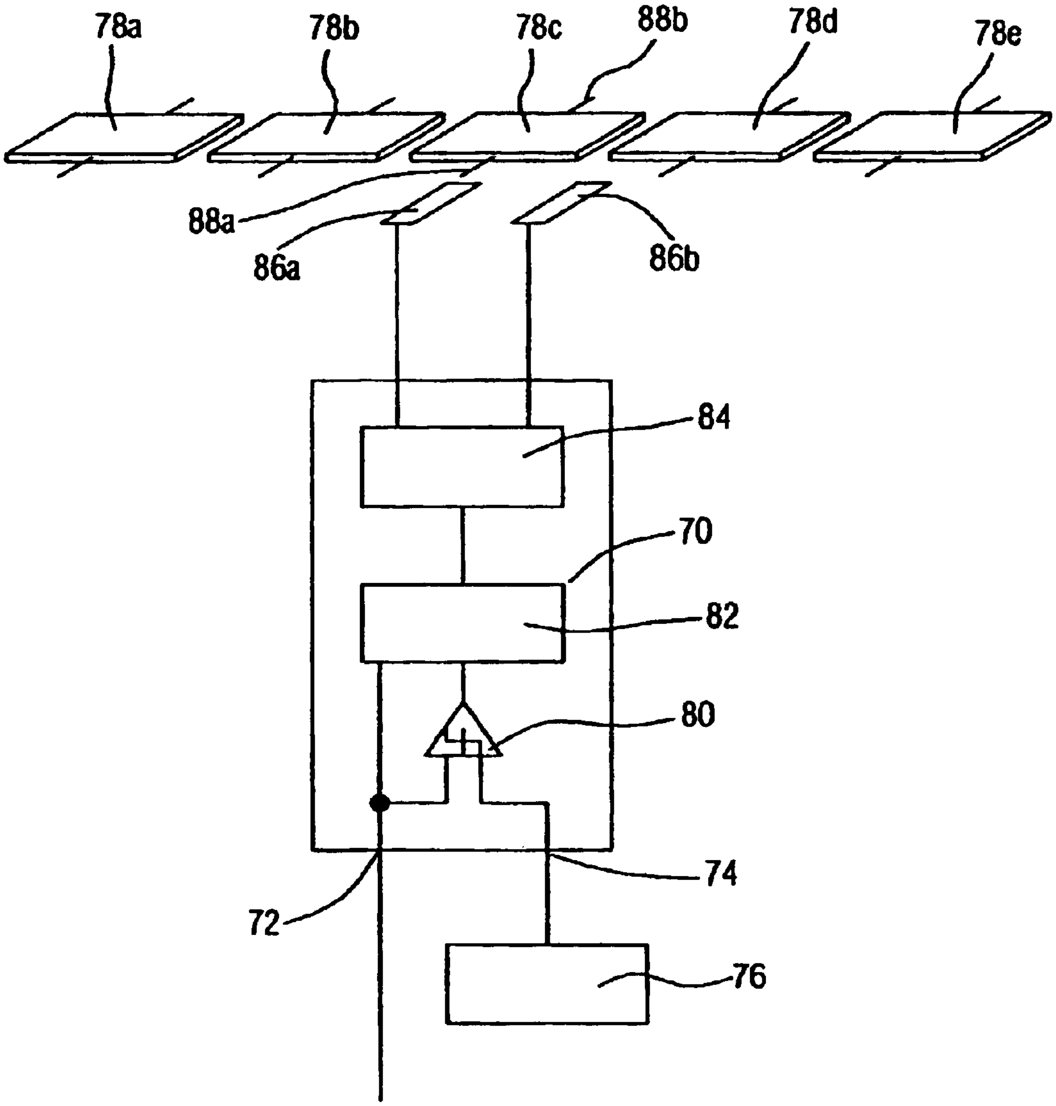
FIG. 3 is a schematic view of the inventive apparatus according to a preferred embodiment.
Figure 7:
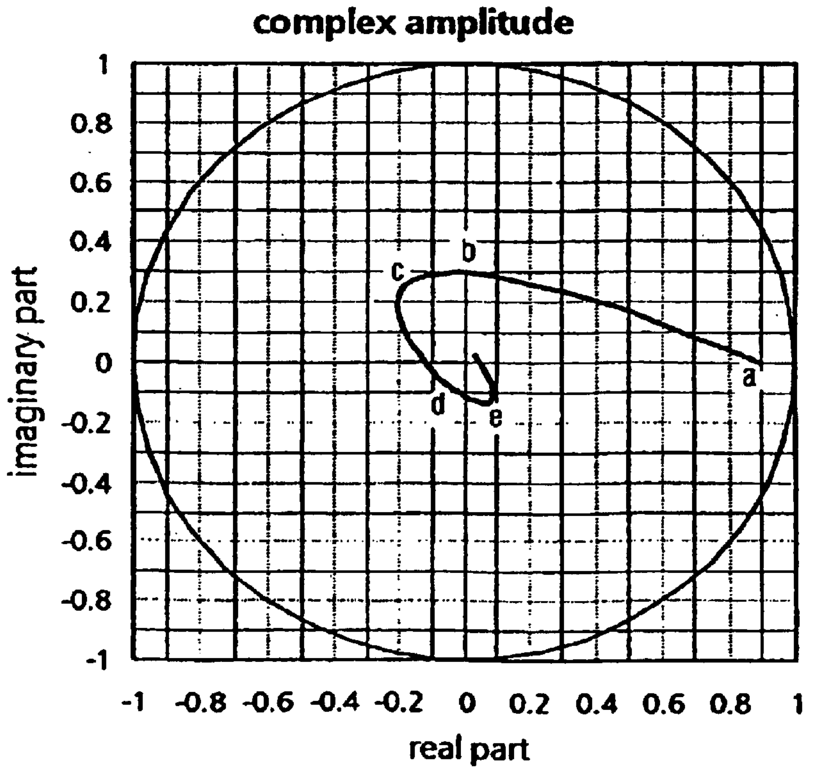
FIG. 7 is a graph of the complex amplitude of the intensity of FIG. 6.

FIG. 3 shows the inventive apparatus according to a preferred embodiment. The apparatus 70 comprises an input 72 for receiving a signal representing a predetermined intensity and an input 74 for receiving a signal representing a threshold intensity, preferably a non-zero threshold intensity. The signal representing the predetermined intensity usually is provided by an external device, e.g. a computer, in the memory of which the pattern to be transferred to a substrate is stored as a bitmap. The apparatus 70 further comprises a comparator 80 for determining whether the predetermined intensity received at the input 72 is greater than the threshold intensity received at input 74. Further, the apparatus 70 comprises a controller 82 connected to the input 72 and receiving the predetermined intensity. The controller 82 is connected to the comparator 80 and receives a signal indicating whether the predetermined intensity at input 72 is greater than the threshold intensity at input 74. Controller 82 controls a driver circuit 84 which is connected to actuators 86*a*, 86*b*, for examples electrodes arranged in parallel to and below a micro-mirror 78*c*. The driver 84 applies voltages to the actuators 86*a*, 86*b* thereby producing electrostatic fields and electrostatic forces between the actuators 86*a*, 86*b* and the micro-mirror 78*c*. The micro-mirror 78*c* is supported by hinges 88*a*, 88*b*. The micro-mirror 78*c* is a non-planar micro-mirror the intensity response versus deflection (intensity response curve) and the complex amplitude of which are shown in FIGS. 6 and 7. In the memory 76, the intensity of the second maximum is stored. Besides the above described implementation of the SLM with a plurality of electro-statically controlled mirrors other well known implementations of a SLM can be used in which the deflection of the pixels would be controlled accordingly.

If the apparatus 70 receives at the input 72 a signal representing a predetermined intensity which is greater than the threshold intensity, the deflection of the mirror will be controlled such that an intensity in the first portion 58 in FIGS. 1 and 2 is obtained, i.e., a deflection between the deflection corresponding to the first maximum and the deflection corresponding to the first minimum. If the predetermined intensity is equal to or less than the threshold intensity, the controller 82 via the driver circuit 84 and the actuators 86*a*, 86*b* will control the deflection of the micro-mirror so as to obtain an intensity to be in the second portion 60 shown in FIG. 1 and 2, i.e., between the deflections corresponding to the second maximum 54 and the second minimum 56.

Figure 4:
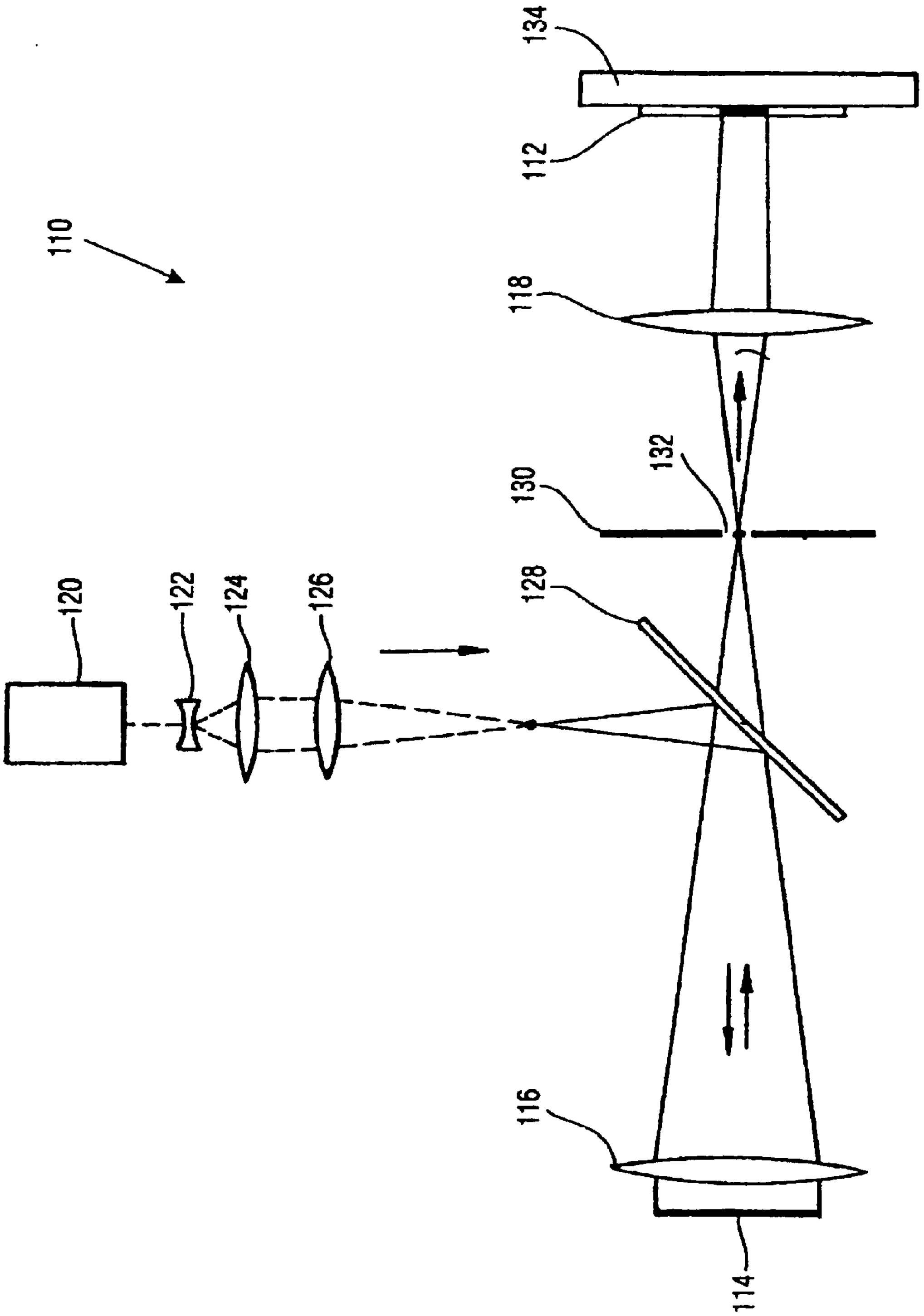
FIG. 4 is a schematic view of a pattern generator including a SLM being operated in accordance with the present invention.
Figure 5:
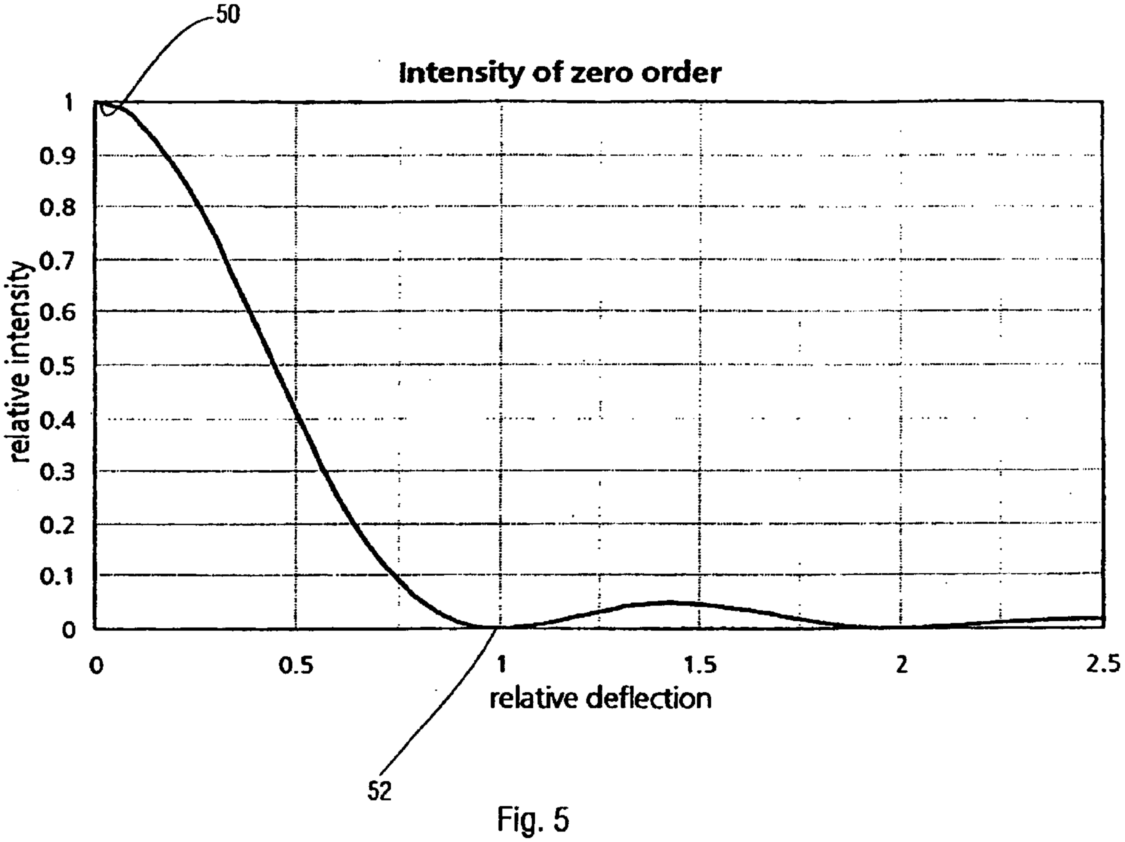
FIG. 5 is a graph of the relative intensity versus the relative deflection for a perfectly planar mirror.

FIG. 4 shows an example for a pattern generator 110 for the exposure of a substrate 112. The pattern generator is for example similar to the one described above for the second prior art approach, i.e. the system no longer described by classical light rays, and a SLM used is described as a phase grating generating interference. The SLM is controlled in accordance with the present invention as outlined above. The substrate 112 is for example a semiconductor wafer or a quartz plate with a thin chrome layer, which is to be patterned to obtain a mask. The pattern to be produced is generated by appropriately programming the pixels (mirrors) of the SLM. The pattern is transferred via an imaging system having two lenses 116 and 118 to the substrate. A light source 120, e.g., laser, illuminates the SLM 14 via optics 126 and the partially reflective plate 128. A screen 130 is arranged with an aperture 132. In this way, light reflected from a micro-mirror of the SLM not being deflected passes through the aperture 132 and illuminates the associated pixel on the substrate 112. The screen 130 blocks light reflected from a micro-mirror of the SLM being deflected. The substrate 112 is supported by a movable table 134.

The present invention is preferably applied to systems which can not be described by classical light rays.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for controlling exposure of a surface of a substrate in a process of structuring the substrate with light of a predetermined intensity, the light being directed to the surface by means of a deflectable mirror, the intensity having a first maximum at a first deflection of the deflectable mirror, a first minimum at a second deflection of the deflectable mirror, a second maximum at a third deflection of the deflectable mirror, and a second minimum at a fourth deflection of the deflectable mirror, the method comprising:

receiving a signal representing the predetermined intensity;

receiving a signal representing a threshold intensity, the threshold intensity being equal to or less than the intensity of the second maximum;

determining whether the predetermined intensity is greater than the threshold intensity; and controlling the deflection of the deflectable mirror to be between the first deflection and the second deflection when the predetermined intensity is greater than the threshold intensity, and to be equal to or greater than the third deflection when the predetermined intensity is equal to or less than the threshold intensity.

2. The method according to claim 1, wherein the deflection of the deflectable mirror is controlled to be between the third deflection and the fourth deflection when the predetermined intensity is equal to or less than the threshold intensity.

3. The method according to claim 1, wherein the first maximum is the brightest maximum of the intensity response curve of the deflectable mirror, the first minimum is the minimum next to the first maximum of the intensity response curve, the second maximum is a weaker maximum of the intensity response curve either next to the first minimum or at even larger deflection, and the second minimum is the minimum next to the second maximum of the intensity response curve.

4. The method according to claim 1, wherein the deflectable mirror is a reflection element of a spatial light modulator generating an interference pattern.

5. The method according to claim 1, wherein the step of controlling comprises actuating the deflectable mirror by means of a non-linear driver circuit.

6. The method according to claim 1, wherein the threshold intensity is a non-zero intensity.

7. An apparatus for controlling exposure of a surface of a substrate in a process of structuring the substrate with light of a predetermined intensity, the light being directed to the surface by means of a deflectable mirror, the intensity having a first maximum at a first deflection of the deflectable mirror, a first minimum at a second deflection of the deflectable mirror, a second maximum at a third deflection of the deflectable mirror, and a second minimum at a fourth deflection of the deflectable mirror, the apparatus comprising:

means for receiving a signal representing the predetermined intensity;

means for receiving a signal representing a threshold intensity, the threshold intensity being equal to or less than the intensity of the second maximum;

a comparator for determining whether the predetermined intensity is greater than the threshold intensity; and a controller for controlling the deflection of the deflectable mirror to be between the first deflection and the second deflection when the predetermined intensity is greater than the threshold intensity, and to be equal to or greater than the third deflection when the predetermined intensity is equal to or less than the threshold intensity.

8. The apparatus according to claim 7, wherein the controller is further implemented such that the deflection of the deflectable mirror is between the third deflection and the fourth deflection when the predetermined intensity is equal to or less than the threshold intensity.

9. The apparatus according to claim 7, the first maximum is the brightest maximum of the intensity response curve of the deflectable mirror, the first minimum is the minimum next to the first maximum of the intensity response curve, the second maximum is a weaker maximum of the intensity response curve either next to the first minimum or at even larger deflection, and the second minimum is the minimum next to the second maximum of the intensity response curve.

10. The apparatus according to claim 7, wherein the deflectable mirror is a reflective mirror of a spatial light modulator generating an interference pattern.

11. The apparatus according to claim 7, further comprising an actuator associated with the deflectable mirror, and a non-linear driver circuit for driving the actuator.

12. The apparatus according to claim 7, wherein the threshold intensity is a non-zero intensity.

13. An imaging device comprising:

a light source for emitting light;

a spatial light modulator defining a pixel pattern to be transferred to a surface of a substrate, and receiving light from the light source, the spatial light modulator comprising an apparatus for controlling exposure of a surface of a substrate in a process of structuring the substrate with light of a predetermined intensity, the light being directed to the surface by means of a deflectable mirror, the intensity having a first maximum at a first deflection of the deflectable mirror, a first minimum at a second deflection of the deflectable mirror, a second maximum at a third deflection of the deflectable mirror, and a second minimum at a fourth deflection of the deflectable mirror, the apparatus comprising:

means for receiving a signal representing the predetermined intensity;

means for receiving a signal representing a threshold intensity, the threshold intensity being equal to or less than the intensity of the second maximum;

a comparator for determining whether the predetermined intensity is greater than the threshold intensity; and a controller for controlling the deflection of the deflectable mirror to be between the first deflection and the second deflection when the predetermined intensity is greater than the threshold intensity, and to be equal to or greater than the third deflection when the predetermined intensity is equal to or less than the threshold intensity; and a movable table supporting the substrate.

* * * * *